Aug. 4, 1936.    J. V. SCHAFER    2,049,666
FISHING REEL
Filed June 18, 1934    2 Sheets-Sheet 1
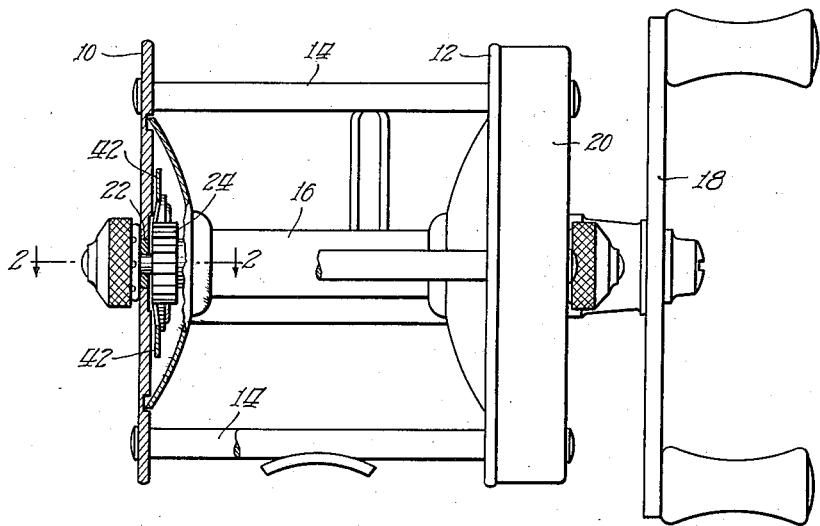
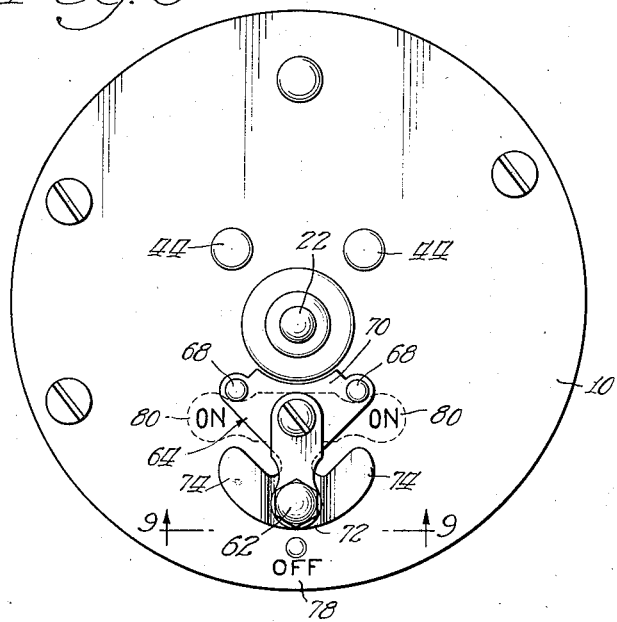
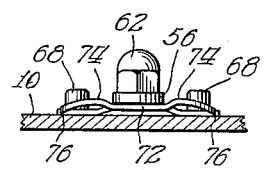
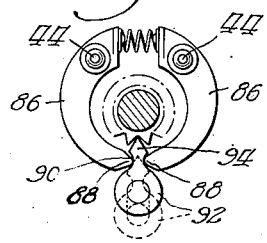
Inventor
John V. Schafer
By Freeman and Sweet
Attys.

Aug. 4, 1936.   J. V. SCHAFER   2,049,666
FISHING REEL
Filed June 18, 1934   2 Sheets-Sheet 2
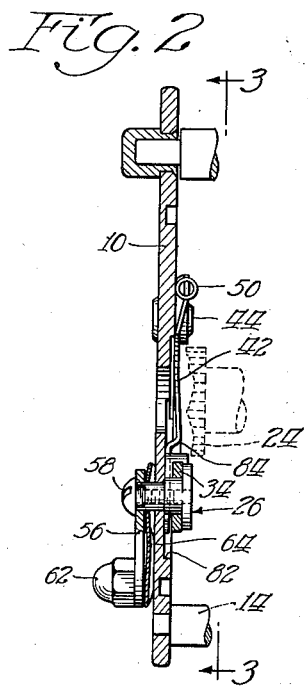
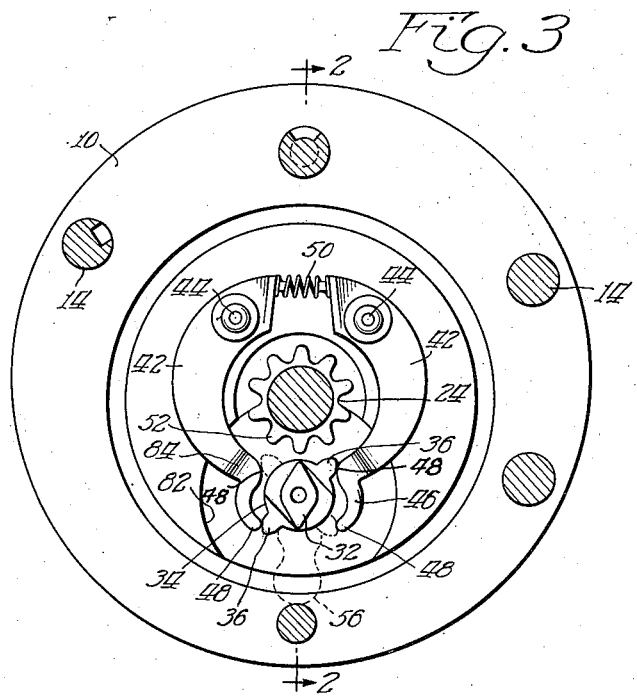
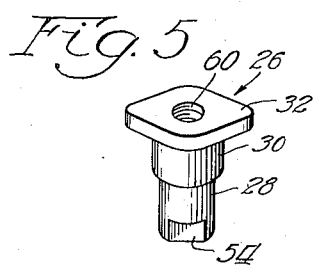
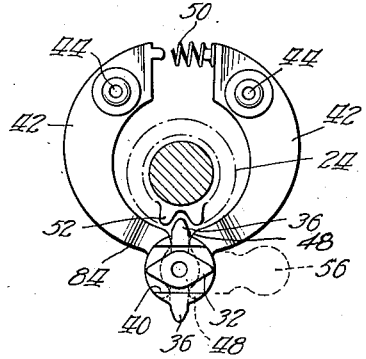
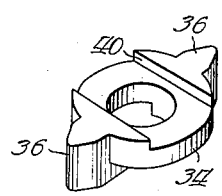
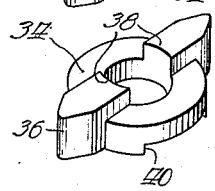
Inventor:
John V. Schafer
By: Freeman and Sweet
Attys.

Patented Aug. 4, 1936

2,049,666

UNITED STATES PATENT OFFICE 2,049,666

FISHING REEL

John V. Schafer, Bronson, Mich., assignor to Bronson Reel Company, Bronson, Mich., a corporation of Michigan Application June 18, 1934, Serial No. 731,012

15 Claims. (Cl. 242—84.6)

My invention relates to fishing reels and includes among its objects and advantages increased durability of the click mechanism, and the complete housing of all parts that are moved by operation of the click combined with externally accessible means for adjustment of the click.

In the accompanying drawings:

Figure 1 is a side elevation of a complete reel partly broken away in section to show the click mechanism;

Figure 2 is a section on line 2—2 of Figure 1;

Figure 3 is a section on line 3—3 of Figure 2;

Figure 4 is a detail of part of the parts illustrated in Figure 1 adjusted to hold the click in operative position.

Figure 5 is a perspective of the shaft for supporting and adjusting the click;

Figure 6 is a perspective of the click element proper;

Figure 7 is a perspective of the same element turned upside down;

Figure 8 is an end view of the click end of the reel;

Figure 9 is a section on line 9—9 of Figure 8; and

Figure 10 is a detail similar to Figure 4 with a different click member.

In the embodiment of the invention selected for illustration the reel comprises the usual end plates 10 and 12 united into a frame by pedestals 14 and provided with journals supporting the usual spool 16 driven by the crank 18 through suitable mechanism housed in the housing 20. On the end of the spool remote from the housing 20 and adjacent the bearing 22 I mount the click wheel 24. The click proper is supported on a shaft 26 having a cylindrical portion 28 bearing in the end plate 10, a cylindrical portion 30 of larger diameter defining a shoulder bearing against one face of the plate 10 and constituting a journal for the click element proper; and a diamond-shaped head 32.

The click element proper comprises a disk portion 34 with click points 36 projecting therefrom at diametrically opposite points. The click points are of greater axial dimensions than the disk portion, and their axially extending portions extend inwardly also at 38 to increase the bearing surface engaging the pintle 30. In the inner face of the disk 34 I fashion a channel 40 extending generally at right angles to the line between the click points 36. The diamond head 32 rides in the channel 40 with substantially ninety degrees of lost motion. Arcuate pressure arms 42 are pivoted at spaced points 44 and extend around the click wheel to terminate in the pressure feet 46. Each foot has spaced toes 48 lying between the plane of the disk 34 and the end plate 10 and pressing against the axially extending portions of the points 36 at all times. A single helical spring 50 lies between the ends of the short arms of the pressure levers 42 and tends at all times to urge the parts into the position of Figure 4 with the click points 36 in operative position, and both toes 48 of each lever pressing against the click points or the inward extensions 38 thereof. In this position the click is operative and movement of the teeth 52 by reason of rotation of the spool will deflect the adjacent click point 36 from the position of Figure 4 expanding the pressure arms slightly against the force of the spring 50 until the tooth escapes past the click point and the click point snaps back against the next tooth.

The outer end of the shaft 26 is provided with flat portions 54 engaged by the external manually operated lever 56. The operating lever is held in place by the fastening screw 58 entering the threaded bore 60 in the shaft 26. The remote end of the operating lever carries a projection 62 functioning as a handle. A cover plate 64 is riveted at 68 to the end plate 10 and comprises a main triangular body portion 70 apertured to receive the shaft 26, an arm 72, and arcuate lateral wings 74 lying under the path of the end of the adjusting lever 56. Each wing 74 is curved up immediately adjacent the arm 72 and then down again so that its end bears against the plate 10 as clearly indicated at 76 in Figure 9. The plate 10 may be provided with suitable indicia indicated in Figure 8 saying "Off" at 78 and "On" at each of two spaced points 80.

When the lever 56 is in the position of Figures 8 and 9, the parts inside may be in the position of Figure 3 with the diamond head 32 radially positioned and its points bearing against the side walls of the channel 40 to hold the click element proper in a position displaced forty-five degrees from the position of Figure 4 with the click points inoperative and each click point bearing against one only of the toes of the pressure feet, holding the pressure feet wide apart. Or the click element proper may occupy the position shown in dotted lines in Figure 3, depending on whether the lever 56 was moved to the position of Figures 8 and 9 from a position to the right of the position of Figure 8 or from a position to the left.

In Figure 10 I have indicated the availability of the spring held lever arms of Figure 4 for action with an ordinary click member, of the type disclosed in United States Patent 271,166. The arms 86 differ from the arms 42 of Figure 4 only in having single contact points 88 adapted to engage the neck 90 of the click member 92, or to bear against the outer inclined faces of the head 94 when the click member is withdrawn to the dotted line position.

When the click is in operative position, the actuation of it causes no displacement of any externally accessible or visible part, and the bearing at 28 for the adjusting shaft is covered by the plate 64, and effective protection is thus afforded to the parts inside. I prefer to form a shallow counter sink 82 in the end plate 10 and offset the pressure arms at 84 so that the feet 46 operate in this depression with a resultant saving in the overall axial dimensions of the mechanism.

With the parts in the position of Figure 4, rotation of the click wheel 24 will deflect the point 36 until it slips over the end of a tooth 52. This rotation involves a sliding movement of the pressure toes along the sides of the click points, and the return of the click is accompanied by a reversed sliding movement. This involves a small but definite absorption of energy by the click, not sufficient to embarrass the angler in case he forgets to remove the click after a fish strikes, but sufficient to prevent running out of the line as from a free spool or because of the weight of an ordinary sinker in case a random movement by the angler jerks the click past a few notches. Because a substantial portion of the energy absorbed by the click is absorbed by the friction of the pressure toes, the wear on the click point when the inexperienced angler uses it as a drag, is correspondingly reduced.

The rivets 68 function as stop members for the lever 72 in each "on" position, and the upwardly bulging wings 74 bear against the bottom of the lever 72, to guide the user in moving it to the "off" position.

Without further elaboration, the foregoing will so fully explain my invention that others may, by applying knowledge current at the time of application, readily adapt the same for use under various conditions of service.

I claim:

1. In a fishing reel, in combination: a spool; a frame in which said spool is journaled; a toothed click wheel at one end of said spool; a click member having points; a stationary support for said member; said support and click member having interengaging cam portions for holding said click in any one of a plurality of inoperative positions; and externally accessible means, stationary during operation of the click, for adjusting the click member into any one of said positions; said adjusting means comprising an adjusting element rotatably mounted in said frame and projecting outwardly therefrom, and resilient means inside said frame pressing on said member.

2. In a fishing reel, in combination: a spool; a frame in which said spool is journaled; a toothed click wheel at one end of said spool; a click member having points; a stationary support for said member; said support and click member having a rotary lost motion connection; externally accessible means, stationary during operation of the click, for rotating the support; and resilient means inside said frame, pressing on said member and tending to hold it in operative position, said support being rotatable into at least one position holding said member inoperative, and into a plurality of positions permitting said member to operate, one of said positions opposing one of said points to the wheel teeth, and the other opposing a different point.

3. In a fishing reel, in combination: a frame; a click mounted on said frame; said click having a plurality of points; and selective manual adjusting means accessible while the reel is in use, for adjusting said click to bring any one of said points into operative position; said frame including an end plate; and said adjusting means extending through said end plate; said adjusting means being movable into three positions, an intermediate off position where neither point is operative, and an on position on each side of said intermediate position.

4. In a fishing reel, in combination: a frame; a spool journaled in said frame; a toothed click wheel on said spool; a click member mounted in said frame; said click member having a point adapted to be positioned in the path of the teeth of said wheel; resilient means tending to hold said point in the path of said teeth; said resilient means including a spring and a transmission between said spring and said click member; said transmission including rigid elements entirely housed in said frame and having sliding contact with each other during deflection and return of said point; and cam means forming part of said transmission and shaped to hold said click member in any one of a plurality of operative positions, or in at least one inoperative position; said click member having a plurality of points, one for each operative position.

5. A fishing reel comprising, in combination: a frame; a spool journaled on said frame; a click wheel on said spool; a click having a plurality of click points; a click support having cam surfaces for holding said click in any one of a plurality of inoperative and in any one of a plurality of operative positions; and a single spring acting on said click to hold it against said cam surfaces, and to actuate it when in operative position; said click moving by rotation into all said positions; and said support moving by rotation into two operative positions and into only one inoperative position.

6. In a fishing reel, in combination: a frame; a spool journaled in said frame; a click wheel on said spool; a click shaft journaled in said frame on an axis parallel to the spool axis and capable of rotation but restrained against axial movement; a click member having a plurality of points and pivotally mounted on said click shaft; a connection between said member and shaft permitting relative lost motion by rotation, said connection including a polygonal head on said shaft and a groove in said member receiving said head, whereby when said head is radially positioned said member is held inoperative, and when said head is circumferentially positioned said click member is permitted to move into operative position; an external operating lever on said click shaft; a plate underlying said external operating lever and having spring wings tending to hold said lever in a radial off position or in either one of two diametrically opposite circumferential on positions; rigid arcuate pressure arms pivoted on symmetrically spaced axes parallel to the spool axis and on the opposite side of said click wheel with respect to said click member; said arms encircling said click wheel and having terminals, each terminal having spaced toes for camming engagement with said click member; said click member having a downwardly projecting rib parallel to the click points and adapted to lie between the toes; a coil spring positioned between the heels of said pressure arms and tending to push said heels away from each other and said toes against said rib.

7. In a fishing reel, in combination: a frame; a spool journaled in said frame; a click wheel on said spool; a click shaft journaled in said frame on an axis parallel to the spool axis; a click member having a plurality of points and pivotally mounted on said click shaft; a connection between said member and shaft permitting relative lost motion by rotation, said connection including a polygonal head on said shaft and a groove in said member receiving said head; an external operating lever on said click shaft; rigid pressure arms pivoted on symmetrically spaced axes parallel to the spool axis and on the opposite side of said click wheel with respect to said click member; said arms having terminals, each terminal having spaced toes for camming engagement with said click member; said click member having a downwardly projecting rib parallel to the click points and adapted to lie between the toes; and a coil spring tending to push said toes against said rib.

8. In a fishing reel, in combination: a frame; a spool journaled in said frame; a click wheel on said spool; a click member; rigid arcuate pressure arms pivoted on symmetrically spaced axes parallel to the spool axis and having terminals; each terminal having spaced toes for camming engagement with said click member; said click member having a downwardly projecting rib parallel to the click points and adapted to lie between the toes.

9. In a fishing reel, in combination: a frame; a spool journaled in said frame; a click wheel on said spool; a click member; rigid movable pressure arms having terminals for engagement with said click member; and a coil spring tending to push said arms against said member.

10. In a fishing reel, in combination: a frame; a spool journaled in said frame; a click wheel on said spool; a click member; rigid pivoted pressure arms having terminals to engage said click member; and a coil spring positioned between said pressure arms and tending to push said arms against said member.

11. In a fishing reel, in combination: a frame; a spool journaled in said frame; a click wheel on said spool; a click member pivoted beside said wheel; two spaced pivots beside said wheel on the side generally opposite said click member; a rigid transmission element on each of said pivots, having its free end shaped for operative engagement with said click member; and a compression spring acting on said elements on the side opposite said click member and tending to force them against said click.

12. In a fishing reel, in combination: a frame; a spool journaled in said frame; a click wheel on said spool; a click member pivoted beside said wheel; two spaced pivots beside said wheel on the side generally opposite said click member; a rigid transmission element on each of said pivots, having its free end shaped for operative engagement with said click member; and a spring acting on said elements on the side opposite said click member and tending to force them against said click.

13. In a fishing reel, in combination: a frame; a spool journaled in said frame; a click wheel on said spool; a click member beside said wheel; a pivot supporting said click member and extending outside said frame; an operating lever on the outer end of said frame movable through substantially only 180°; resilient means operating constantly on said click member and tending to move it into either one of two operative positions 180° apart; and a connection between said pivot and said click member permitting 90° of lost motion.

14. In a fishing reel, in combination: a frame; a spool journaled in said frame; a toothed click wheel on said spool; a click member mounted in said frame; said click member having a point adapted to be positioned in the path of the teeth of said wheel; and resilient means tending to hold said point in the path of said teeth; said resilient means including a spring and a transmission between said spring and said click member; said transmission including a rigid element movably supported on said frame and a part actuated by said rigid element, said element and actuated part having sliding contact with each other during deflection and return of said point.

15. A combination according to claim 14 in which the actuated part having sliding contact with said rigid element is the click member itself.

JOHN V. SCHAFER.